UNITED STATES PATENT OFFICE.

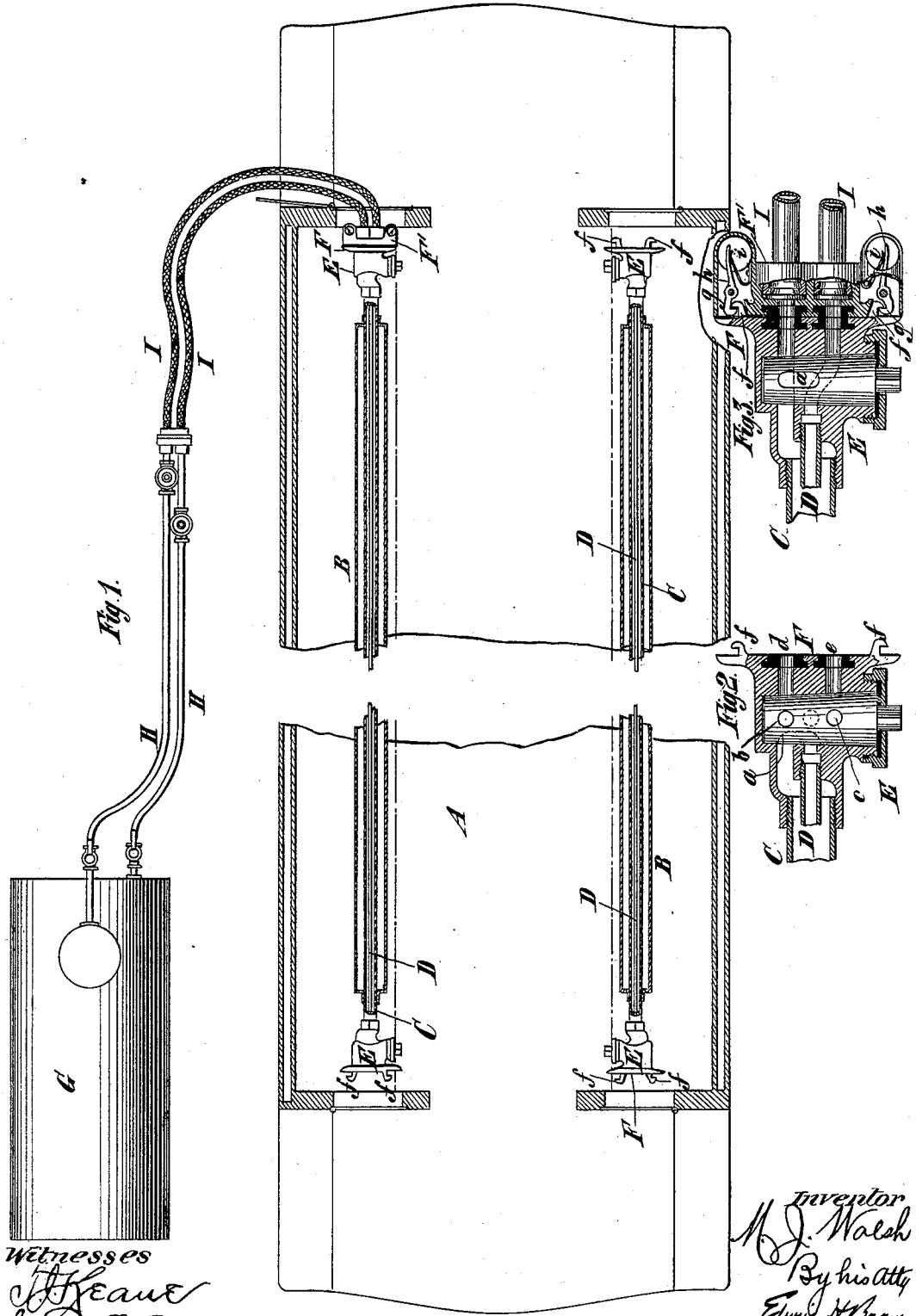

MAURICE J. WALSH, OF NEW YORK, N. Y., ASSIGNOR, BY MESNE ASSIGNMENTS, TO LOUIS FITZGERALD, OF SAME PLACE.

APPARATUS FOR HEATING RAILWAY-CARS.

SPECIFICATION forming part of Letters Patent No. 269,489, dated December 19, 1882.

Application filed July 20, 1882. (No model.)

*To all whom it may concern:*

Be it known that I, MAURICE J. WALSH, of New York, in the county and State of New York, have invented a certain new and useful Improvement in Apparatus for Heating Railway-Cars, of which the following is a specification.

My present improvement is especially adapted for use in heating single cars or vehicles, in contradistinction to trains of cars.

The improvement consists in the combination, with a vehicle, of a receptacle containing acetate of potash or acetic acid and caustic soda, with or without water, a pipe or pipes extending through the same, means whereby the pipe or pipes at one end may be temporarily connected with the source of a heating agent, and means whereby the heating agent may be allowed to escape from the other end of the pipe or pipes beyond the receptacle, a circulation of the heating agent through the receptacle being thus provided for. I preferably combine with the above means for closing the pipe or pipes when disconnected from the source of the heating agent, and a pipe or conduit for conveying away the exhaust or expended heating agent after its circulation through the pipe or pipes, which pass through the receptacle.

In the accompanying drawings, Figure 1 is a sectional plan of a car and an apparatus for heating the same, embodying my improvement. Fig. 2 is an enlarged sectional view of the ends of pipes extending through a receptacle arranged in the car for containing a heat-storage material, and Fig. 3 is an enlarged sectional view of the ends of these pipes coupled to pipes extending from the source of a heating agent.

Similar letters of reference designate corresponding parts in all the figures.

A designates a car, which may be of the kind ordinarily drawn by horses.

B designates a receptacle, which may be made of metal, and is adapted to contain acetate of potash or a mixture of acetic acid and caustic soda, with or without the addition of water.

C designates a metal pipe extending through this receptacle.

D designates a pipe arranged within the pipe C, and also extending through the said receptacle. At each end of the pipes C D, outside the receptacle B, are cocks E. These cocks each have a port, *a*, consisting of a recess or cavity in the circumference of the plug, adapted, when the plug is properly turned, to close the ends of the pipes, and at the same time establish communication between them. In the plug of each cock are also two ports, *b c*, which, when the plug is reversely turned, establish communication between the said pipes and corresponding ports, *d e*, extending beyond the cock into a coupling-piece, F. The coupling-piece F has rigid hooks *f*.

G designates a steam-boiler.

H designates rigid pipes extending therefrom, and I designates flexible pipes extending from the rigid pipes and connected with a coupling-piece, F'. This coupling-piece F' has hooks *g* arranged upon levers *h*, actuated by springs *i*, so that the hooks will be impelled inwardly. When the coupling-pieces are pressed together face to face the hooks *g* will slip over and engage with the hooks *f*, and if then the adjacent cock E is turned to establish communication between its pipes C D and the ports *d e* and the other cock of the said pipes is turned to close their other ends and establish communication between them steam will be caused to traverse the pipes and impart heat to the heat-storage material. When this material is sufficiently heated the coupling F' is detached from the coupling F, and the cock E adjacent to the latter is turned so as to close the pipes C D. This heat will suffice to heat the car comfortably for a considerable time. The material in the other receptacle may be heated in the same manner.

Obviously one of the pipes H may extend to any suitable receptacle for the exhaust or expended heating agent other than the boiler G. One pipe, extending through a receptacle, B, and connected at one end with the steam-boiler and at the other with a receptacle for the waste or extended heating agent, can be used.

When I employ acetate of potash I may use with it an equal amount, by weight, of hyposulphite and an amount of water equaling in weight the weight of both the acetate of potash and hyposulphite.

I may use additional and larger reservoirs for the heat-storage material near the ends of the car outside the receptacle B close to the cocks E, if desirable.

What I claim as my invention, and desire to secure by Letters Patent, is—

1. The combination, with a vehicle, of a receptacle containing acetate of potash or acetic acid and caustic soda, with or without the addition of water, a pipe or pipes extending through the same, means whereby the pipe or pipes at one end may be temporarily connected with the source of a heating agent, and means whereby the heating agent may be allowed to escape from the other end of the pipe or pipes beyond the receptacle, a circulation of the heating agent through the receptacle being thus provided for, substantially as specified.

2. The combination, with a vehicle, of a receptacle containing acetate of potash or acetic acid and caustic soda, with or without the addition of water, a pipe or pipes extending through the same, means whereby the pipe or pipes at one end may be temporarily connected with the source of a heating agent, means whereby the heating agent may be allowed to escape from the other end of the pipe or pipes beyond the receptacle, and devices for closing said pipe or pipes when disconnected from the source of the heating agent, substantially as specified.

3. The combination, with a vehicle, of a receptacle containing acetate of potash or acetic acid and caustic soda, with or without the addition of water, a pipe or pipes extending through the same, means whereby the pipe or pipes at one end may be temporarily connected with the source of a heating agent, means whereby the heating agent may be allowed to escape from the other end of the pipe or pipes, and a pipe or conduit for conducting away the exhaust or expended heating agent, substantially as specified.

MAURICE J. WALSH.

Witnesses:
T. J. KEANE,
JAMES R. BOWEN.